United States Patent
Young et al.

(10) Patent No.: US 10,148,435 B2
(45) Date of Patent: Dec. 4, 2018

(54) QUANTUM PHYSICAL UNCLONABLE FUNCTION

(71) Applicant: Quantum Base Limited, Stockport, Cheshire (GB)

(72) Inventors: Robert Young, Lancaster (GB); Utz Roedig, Lancaster (GB); Jonathan Roberts, Lancaster (GB)

(73) Assignee: QUANTUM BASE LIMITED, Stockport, Cheshire (GB)

( * ) Notice: Subject to any disclaimer, the term of this patent is extended or adjusted under 35 U.S.C. 154(b) by 160 days.

(21) Appl. No.: 15/128,696

(22) PCT Filed: Mar. 25, 2015

(86) PCT No.: PCT/GB2015/050889
§ 371 (c)(1),
(2) Date: Sep. 23, 2016

(87) PCT Pub. No.: WO2015/150739
PCT Pub. Date: Oct. 8, 2015

(65) Prior Publication Data
US 2018/0219673 A1 Aug. 2, 2018

(30) Foreign Application Priority Data
Apr. 3, 2014 (GB) .................................. 1406002.4

(51) Int. Cl.
*G06F 21/44* (2013.01)
*H04L 29/06* (2006.01)
*H04L 9/08* (2006.01)
*G06N 99/00* (2010.01)

(52) U.S. Cl.
CPC ......... *H04L 9/0866* (2013.01); *G06N 99/002* (2013.01)

(58) Field of Classification Search
CPC ....................................................... G06F 21/44
See application file for complete search history.

(56) References Cited

U.S. PATENT DOCUMENTS

| 9,058,535 B2 | 6/2015 | Guigan |
| 2002/0021003 A1 | 2/2002 | McGrew |

(Continued)

FOREIGN PATENT DOCUMENTS

| CN | 1820278 A | 8/2006 |
| CN | 101551869 A | 10/2009 |

(Continued)

OTHER PUBLICATIONS

European Examination Report for Application No. 15714610.1-1870, dated Oct. 19, 2017, 10 pages.

(Continued)

*Primary Examiner* — Izunna Okeke
(74) *Attorney, Agent, or Firm* — Hoffman Warnick LLC (57) ABSTRACT

Unique Identifier According to a first aspect of the present invention, therein is provided a method of determining or generating a unique identifier for a device, the device exhibiting quantum mechanical confinement, the method comprising: measuring a unique quantum mechanical effect of the device that results from the quantum mechanical confinement; and using the measurement to determine or generate the unique identifier.

13 Claims, 4 Drawing Sheets

(56) References Cited

U.S. PATENT DOCUMENTS

| | | | |
|---|---|---|---|
| 2008/0112596 A1* | 5/2008 | Rhoads | G06K 9/00577 382/115 |
| 2012/0033810 A1* | 2/2012 | Devadas | G06F 21/31 380/46 |
| 2012/0091193 A1 | 4/2012 | Gavinsky et al. | |
| 2014/0162464 A1 | 6/2014 | Dimitrakopoulos et al. | |

FOREIGN PATENT DOCUMENTS

| | | |
|---|---|---|
| CN | 102750529 A | 10/2012 |
| CN | 103491531 A | 1/2014 |
| EP | 1636555 | 3/2006 |
| EP | 2650813 A1 | 10/2013 |
| EP | 2693685 A1 | 2/2014 |
| JP | 2007116216 A | 5/2007 |
| WO | 2004107026 A3 | 12/2004 |
| WO | 2004114204 A1 | 12/2004 |
| WO | 2006071269 A1 | 7/2006 |
| WO | 2007046018 A1 | 4/2007 |
| WO | 2009137203 A2 | 11/2009 |
| WO | 2015150739 A1 | 10/2015 |

OTHER PUBLICATIONS

Goorden, Sebastianus et al.; "Quantum-Secure Authentication with a Classical Key"; Mar. 1, 2013; pp. 8.

Katsia, E et al.; "Integration of organic based Schottky junctions into crossbar arrays by standard UV lithography"; Organic Electronics 9; 2008; pp. 1044-1050.

Rajendran, Jeyavijayan et al.; "Nanoelectronic Solutions for Hardware Security"; International Association for Cryptologic Research; vol. 20121016:123849; Oct. 10, 2012; pp. 9.

Ziegler, Matthew M. et al.; "CMOS/Nano Co-Design for Crossbar-Based Molecular Electronic Systems"; IEEE Transactions on Nanotechnolgoy; vol. 2; No. 4; Dec. 2003; Copyright 2003 IEEE; pp. 217-230.

International Search Report and Written Opinion for PCT/GB2015/050889 dated Jun. 10, 2015; pp. 13.

Search Report for GB1406002.4 dated Sep. 19, 2014; pp. 4.

* cited by examiner

QUANTUM PHYSICAL UNCLONABLE FUNCTION

The present invention relates generally to the determination or generation of a unique identifier for a device, the device exhibiting quantum mechanical confinement.

Many systems, ranging from wireless sensors, to mobile SIMs (subscriber identity modules) and in-car ECUs (engine control units), base security of their communications or similar on a cryptographic key, typically stored locally. For the security to be robust, it is of course important that this cryptographic key has a high degree of uniqueness, a term used in the art. Not only this, it is also important that it is difficult for a potential attacker of the cryptography to clone that key. In more practical terms, it is also desirable that the device providing the cryptographic key has the smallest possible physical and power consumption footprint, while at the same time having a low fabrication cost. The cryptographic key is alternatively or additionally defined or described as a unique identifier.

The unique identification of products leaving a manufacturer or the like can be managed by tagging or fingerprinting those products, specifically by including a unique, difficult to clone (physical) function that can easily and repeatedly be read. A physically (sometimes referred to as physical) unclonable function (PUF) can provide such identification.

Typically, a physically unclonable function is provided on the basis of what would commonly be considered as macroscopic physical principles. For instance, a physically unclonable function may be based on minute changes in quartz crystal oscillation frequency between different crystals, or the different capacitances between different devices as a result of different thicknesses of layers constituting those different devices, or the identification of anomalies (e.g. dead cells) in an array of memory cells. There is little doubt that these approaches do work in practice. However, they do, nevertheless, have disadvantages. It has been realised that a main reason for these disadvantages is the utilisation of macroscopic effects in the generation of the unique identifier. For instance, this might limit the uniqueness of the identifier, or make it more difficult to in some way measure, encode or otherwise define the unique identifier. Also, using macroscopic effects, repeatability and consistency in the determination or generation of a unique identifier may sometimes be compromised, or require significant space or power consumption in a device that provides the identifier.

It is an example aim of example embodiments of the present invention to at least partially obviate or mitigate at least one disadvantage of the prior art, whether identified herein or elsewhere, or to at least provide an alternative to the prior art.

According to the present invention there is provided an apparatus and method as set forth in the appended claims. Other features of the invention will be apparent from the dependent claims, and the description which follows.

According to a first aspect of the present invention, therein is provided a method of determining or generating a unique identifier for a device, the device exhibiting quantum mechanical confinement, the method comprising: measuring (e.g. electrically) a unique quantum mechanical effect of the device that results from the quantum mechanical confinement; and using the measurement to determine or generate the unique identifier.

The measurement may comprise measuring a unique quantum mechanical spectrum of the device.

Using the measurement to generate the unique identifier may comprise encoding and/or storing the result of the measurement as the unique identifier.

The method may comprise heating the device that exhibits quantum mechanical confinement to change the unique quantum mechanical effect of the device, and to therefore facilitate the provision of a new unique identifier for the device.

The heating may be undertaken using a dedicated heater, and/or by passing a current through the device At least a part of the method may be undertaken by another device that comprises and/or is in (e.g. electrical and/or optical) connection with the device that exhibits quantum mechanical confinement.

At least in use, the effect may be arranged to be measurable by the other device in order to determine or generate a unique identifier for the other device, using the unique identifier of the device that exhibits quantum mechanical confinement.

The other device may encode and/or store the unique identifier.

The method may comprise comparing the determined or generated unique identifier of the device that exhibits quantum mechanical confinement with one or more identifiers stored by and/or stored in the other device. The method may further comprise preventing or permitting certain functionality of the other device if the determined or generated unique identifier of the device that exhibits quantum mechanical confinement and one or more stored identifiers are the same (i.e. there is a match).

The device that exhibits quantum mechanical confinement may exhibit quantum confinement in at least one dimension, in at least two dimensions, or in at least three dimensions.

The device that exhibits quantum mechanical confinement may comprise, is and/or provide one or more of: one or more tunnelling barriers; a resonant tunnelling diode; a Schottky barrier; a graphene nanoribbon; quantum mechanical confinement in a layer; quantum mechanical confinement in a ring; quantum mechanical confinement in a dot.

The device that exhibits quantum mechanical confinement may comprise: a GaSb quantum (mechanical) ring in a doped GaAs structure; or a GaSb quantum (mechanical) ring, with AlGaAs tunnelling barriers, in a doped GaAs structure.

According to a second aspect of the present invention, therein is provided use of a device, the device exhibiting quantum mechanical confinement, the use comprising: using the device to determine or generate a unique identifier derived or derivable from a measurable, e.g., electrical, unique quantum mechanical effect (that is, e.g., an electrically measurable unique quantum mechanical effect) of the device that results from the quantum mechanical confinement.

According to a third aspect of the present invention, therein is provided a apparatus, comprising: a first device, the first device comprising and/or being in (e.g. electrical and/or optical) connection with a second device; wherein the second device is a that exhibits quantum mechanical confinement, and wherein the second device has a measurable, e.g. electrical, unique quantum mechanical effect (that is, an electrically measurable unique quantum mechanical effect) that results from the quantum mechanical confinement; and at least in use, the effect is arranged to be measurable (e.g. electrically) by the first device to determine or generate a unique identifier for the second device and thus the first device.

The first device may be an integrated circuit, and: the second device may form a part of the integrated circuit; and/or the second device may connect one pin of the integrated circuit to another pin of the integrated circuit.

For the avoidance of any doubt, one or more features described in relation to any one aspect of the present invention may be used in combination with or in place of any one or more features of another aspect of the present invention, unless such replacement or combination would be understood by the skilled person from a reading of this disclosure to be mutually exclusive. For example, and more particularly, any feature described in relation to a method aspect of the present invention may be readily used in place of or in combination with any feature described in relation to a use or device aspect of the present invention.

For a better understanding of the invention, and to show how embodiments of the same may be carried into effect, reference will now be made, by way of example, to the accompanying diagrammatic figures in which.

As mentioned above, many of the problems with existing methods for determining or generating a unique identifier is that the methods are based on macroscopic physical effects. According to example embodiments of the present invention, it has been realised that at least some of the problems of the prior art may be overcome by determining and/or generating a unique identifier for a device, wherein the device is specifically one that exhibits quantum mechanical confinement. The method comprises measuring a unique quantum mechanical effect of the device that results from the quantum mechanical confinement. Furthermore, the measurement is then used to determine or generate the unique identifier for the device.

The quantum mechanical nature of the method typically allows the device used in the method to be small, and be low power. Device fabrication might also be generally cheaper than devices used in similar macroscopic methods. Perhaps most importantly, however, is that the quantum mechanical nature of the device used in the method allows for the identifier to be particularly unique. This is particularly the case when the quantum mechanical effect that is measured is a spectrum or spectra (e.g. a combination or convolution of more than one spectrum, or measurements or more than one distinct spectrum). For instance, a device exhibiting quantum mechanical confinement, particularly in two or more dimensions, may provide a unique measurable spectrum of specific confinement energy levels of electrons or holes in the structure of the device (or part thereof) that exhibits the confinement. Typically this part of the structure may be a nano-structure in the form of a layer, ring, dot, or other structure, that has spatial dimensions at or below length scales corresponding to the de Broglie wavelength of electrons in the system. The physical properties of such a nano-structure, including its atomic arrangement, size and composition, and the exact form of fields (e.g. strain, magnetic and electric) through the structure may all have an influence on the energies at which charge carriers are confined, according to solutions of the Schrödinger equation for the system. As will be appreciated, it is practically impossible to fabricate two devices that share all of these properties (and possibly more), so no two devices will be exactly the same. Therefore, the nature of confinement will not be the same, and therefore no two measurable quantum mechanical effects as a result of that confinement will be the same.

Therefore, the measurable quantum mechanical effect for such a device can be used as a unique identifier for that device. In other words, it has been realised that the confining structure (or, in general, confinement) provides an efficient and effective physically (sometimes referred to as physical) unclonable function (PUF).

Principles underlying the invention, and example implementations of the invention, will now be described, by way of example only, with reference to FIGS. 1 to 10. The Figures have not been drawn to any particular scale, and are simply provided as diagrammatic aids for understanding the principles underlying the invention, and/or its application.

Figure 1:
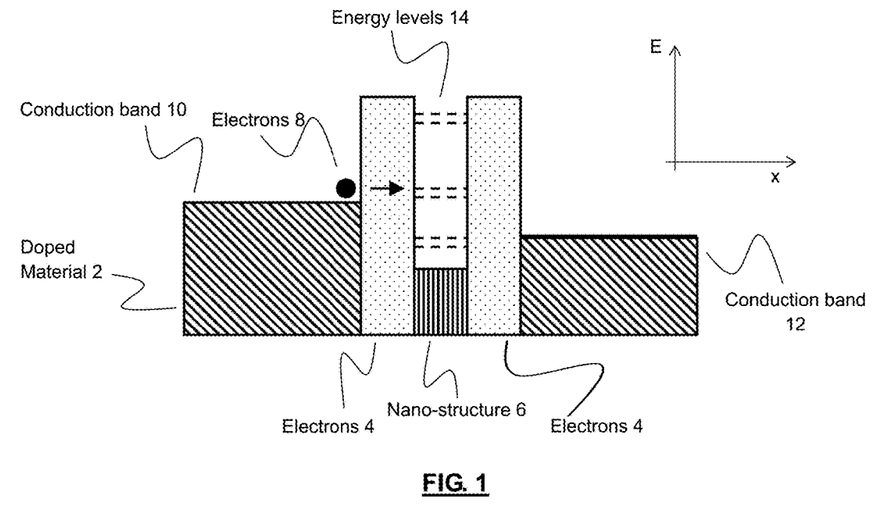
FIG. 1 schematically depicts a band structure and a mode operation of a resonant tunnelling diode, according to an example embodiment.

FIG. 1 schematically depicts a band structure of a resonant tunnelling diode, which exhibits quantum mechanical confinement, and which may provide a unique identifier according to an example embodiment.

The resonant tunnelling diode comprises a doped material 2 in which is provided insulating material 4 that forms tunnelling barriers 4. The tunnelling barriers 4 are located either side of a nano-structure 6 which exhibits or facilitates quantum mechanical confinement of electrons 8. In use, the electrons 4 tunnel through the barriers 4 from a voltage tuneable conduction band 10 on one side of the nano-structure 6 to the conduction band 12 on the other side of the nano-structure 6. Charge transport through the device occurs at specific input conditions, hence the resonant nature of the device.

As mentioned previously, the nano-structure 6 could be a specific, dedicated structure, such as a ring, or dot or the like. However, additionally and/or alternatively, the nano-structure might simply imply that this particular part of the device is or has one or more dimensions which result in quantum mechanical confinement, for example at specific energy levels 14. That is, the nano-structure 6 could be a layer having nano-scale thickness.

In one particular example, the nano-structure 6 of the device of FIG. 1 (or, in other embodiments, any other appropriate device) could be a GaSb hole-confining quantum (mechanical) ring, with AlGaAs tunnelling barriers embedded in a doped GaSb structure, with metal gates. GaSb quantum (mechanical) rings in GaAs have recently been shown to have very deep confining potentials for holes, which result in a large number of well-defined peaks in the transport spectrum for the device.

Figure 2:
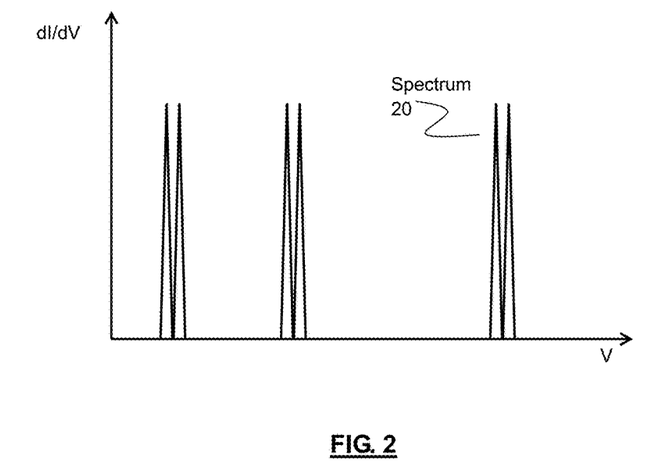
FIG. 2 schematically depicts an idealised quantum mechanical spectrum of the device of FIG. 1.

FIG. 2 shows an example of an idealised transport spectrum referred to in the previous paragraph. The differential of current with respect to voltage is shown plotted against increasing voltage. It can be seen that a well-defined series of peaks forms the spectrum 20. The voltages at which peaks in dI/dV are measured directly relates to the confined energy levels in the nano-structure of the device of FIG. 1. These energy levels, in turn, relate directly to a unique property in the atomic composition of the nano-structure. Therefore, the structure, being unique, provides a unique spectrum, which in turn can serve as a unique identifier for the device. For instance, the spectrum for any particular device can be encoded (that is, digitised or otherwise recorded) and translated into a uniquely identifying key, which could be employed for cryptography or the like.

In the example shown in FIG. 2, charge transport has been used in the measurement to generate or determine the unique identifier of or for the device. However, other ways in which the quantum mechanical confined energy levels could be measured include capacitance-voltage measurements, and optical measurements. For instance, in the case of optical measurements, the intensity of emission is a function of photon energy. For charge transport measurement methods, or methods that rely on charge transport in some way, the carriers could be electrons or holes.

The use of holes as the charge carrier may be advantageous. In most III-V semiconductors, the lowest energy valence band is known as the 'heavy hole' band as the effective mass of the holes in it is large. For quantum mechanical confinement, the position of the bound states is inversely proportional to mass, so this large mass results in more bound states for a given potential well. In the case of GaSb rings/dots in GaAs, the potential well for these heavy holes is very deep, and the mass very large, and this means there are lots of confined energy levels. This results in a very complicated and feature-rich spectrum—that is, a spectrum that is very unique. In other systems, such as those employing graphene, there may be no advantage to using holes rather than electrons, or electrons may be preferable.

Figure 3:
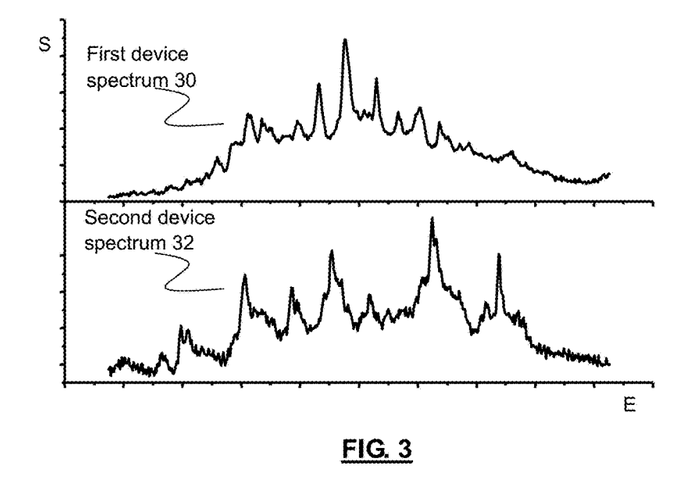
FIG. 3 depicts quantum mechanical spectra obtained from two different, real devices.

FIG. 3 shows optically measured spectra for two different, real devices; a first device 30 and a second device 32. The spectra 30, 32 in these examples are shown against an arbitrary signal level S (which represents optical output) as a function of input energy E. Each device 30, 32 has at least one nano-structure in the form of one or more quantum mechanical dots. The spectra 30, 32 shown in FIG. 2 are a result of a convolution of spectra from each quantum mechanical dot of the respective device. The convolution of different spectra makes the resulting identifier more unique (e.g. harder to copy, or equivalent to a higher degree of encryption) than say, a single spectrum.

Figure 4:
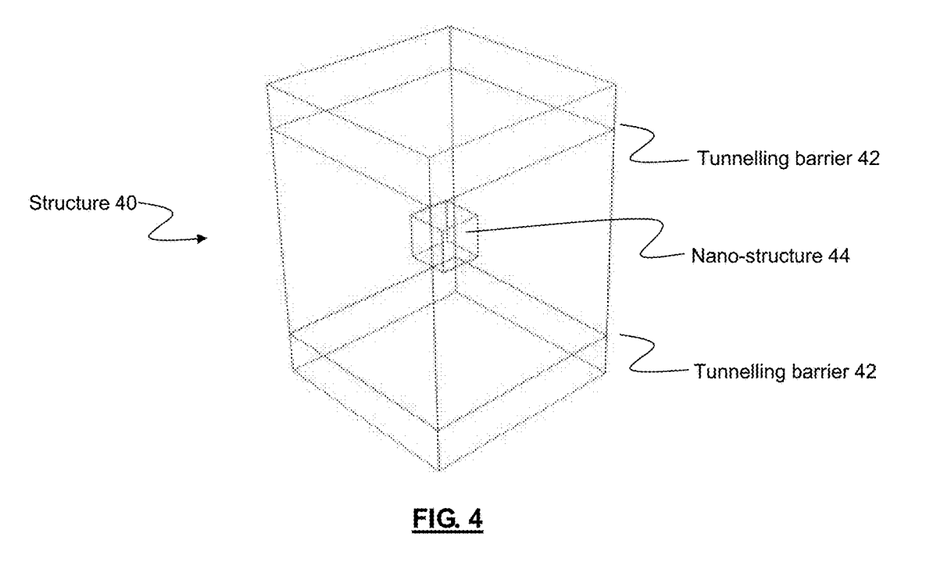
FIG. 4 schematically depicts a perspective wire-frame view of a device exhibiting quantum mechanical confinement, according to an embodiment.

FIG. 4 schematically depicts a perspective view of a wire-frame of a device structure 40 that may be used in accordance with example embodiments. In this particular example, the device structure 40 comprises tunnelling barriers 42 located either side of a nano-structure 44 that exhibits 3-dimensional quantum mechanical confinement. It is noted that other parts of the structure 40 do not exhibit such 3-dimensional quantum confinement. In other examples, the nano-structure 44 could exhibit quantum mechanical confinement in only two dimensions, or in one dimension. However, the greater dimensional degree of quantum mechanical confinement is likely to make the resulting spectrum or spectra even more unique (e.g. harder to copy, or equivalent to a higher degree of encryption), increasing the uniqueness of the identifier that may be generated. In this example, the nano-structure 44 may take, for example the form of a quantum mechanical dot or similar.

Figure 5:
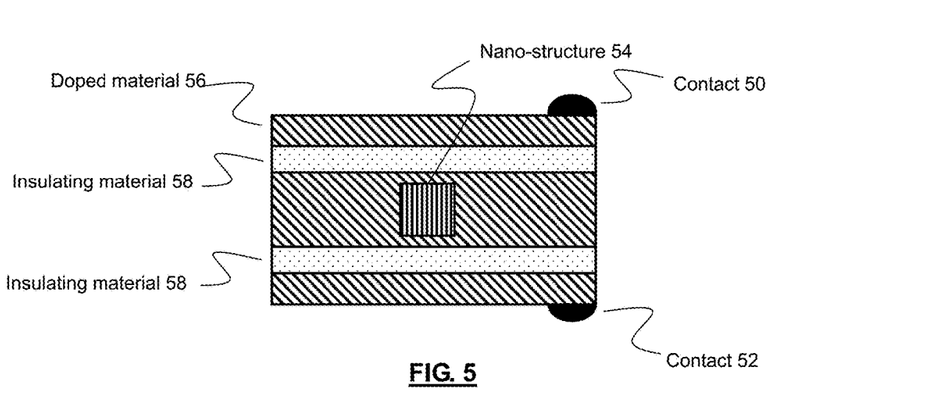
FIGS. 5 and 6 schematically depict different implementations of the more general concept shown in FIG. 4.
Figure 6:
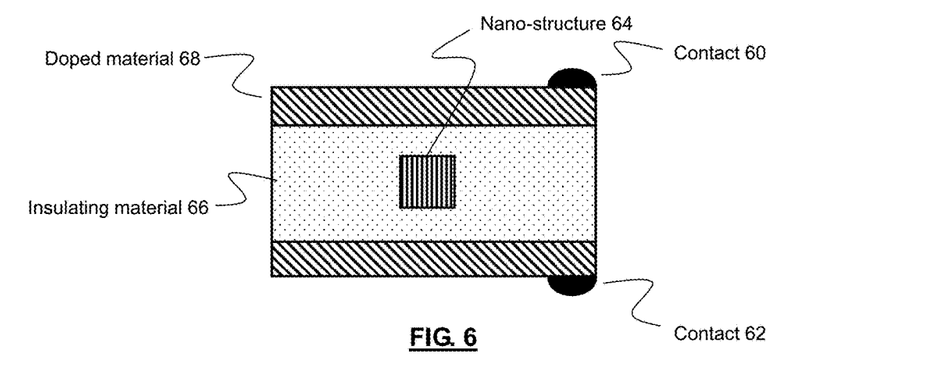

A more detailed and practical implementation of the schematic of FIG. 4 may take various forms, as for example shown in the different examples of FIGS. 5 and 6.

In FIG. 5, the device is shown as comprising positive and negative (typically metal) contacts 50, 52. The more detailed device structure comprises a nano-structure 54 located in a doped material 56. Located either side of the nano-structure 54, and also in the doped material 56, are tunnelling barriers in the form of insulating material 58.

FIG. 6 shows a different example, again comprising positive and negative metal contacts 60, 62. In this example, the nano-structure 64 is located within the insulating material 66 that forms the tunnelling barrier. Located either side of that insulating material 66 is doped material 68.

Figure 7:
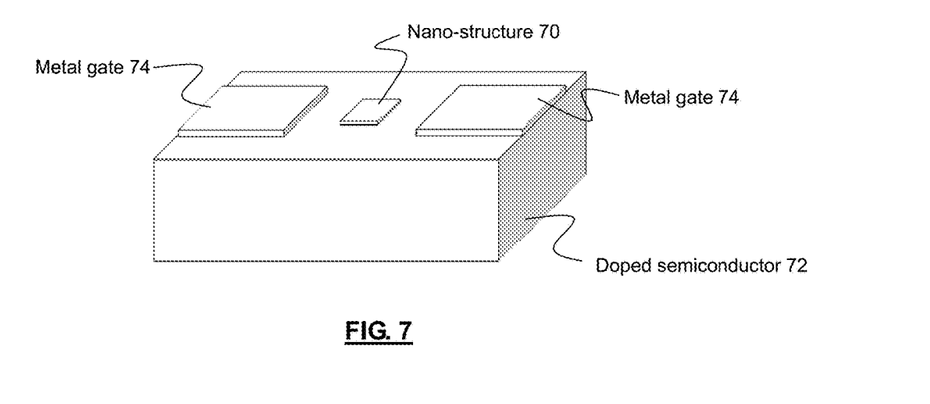
FIGS. 7 and 8 schematically depict another device according to another embodiment, in perspective and plan views respectively.
Figure 8:
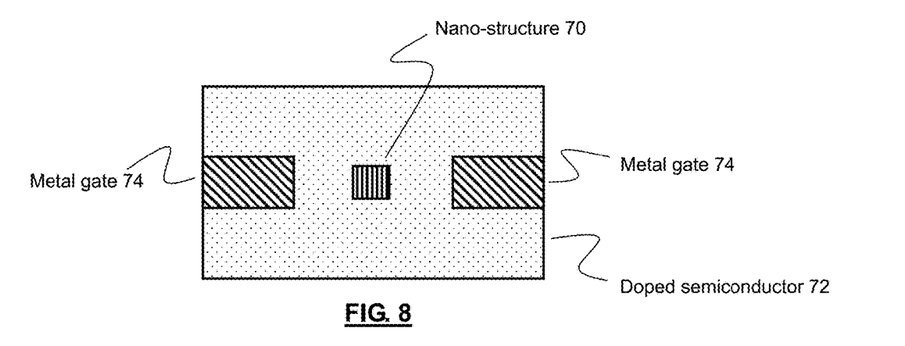

FIGS. 7 and 8 show, respectively, a perspective and plan view of another device. In this device, the nano-structure 70, which may optionally take the form of a quantum mechanical ring, such as the GaSb quantum mechanical ring previously described, is located on or close to the surface of a semi-insulating and doped semiconductor 72. Metal gates 74 form a Schottky barrier. The nature of confinement, and the resulting spectrum, may be the same as, in principle, the spectra already shown in FIGS. 2 and 3.

Figure 9:
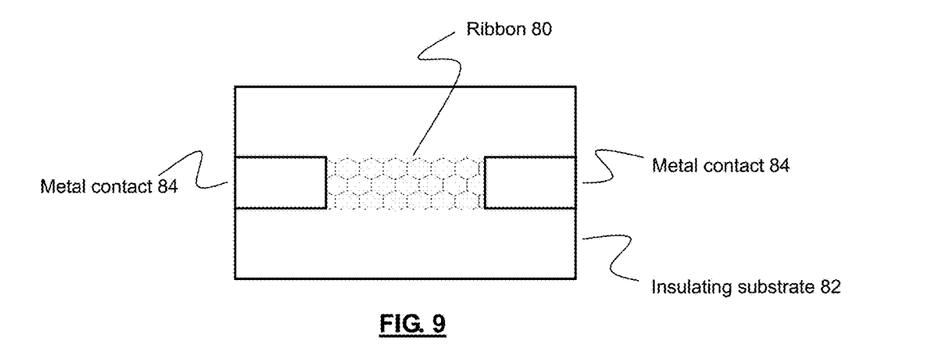
FIG. 9 schematically depicts a plan view of yet another device according to an example embodiment.

FIG. 9 schematically depicts another device. In this device, the nano-structure takes the form of a graphene (nano)ribbon 80 on an insulating substrate 82. The ribbon 80 connects metal contacts 84. In this example, the quantum mechanical confinement is defined by the exact shape of the edges of the ribbon 80, and/or by how flat the ribbon is, and/or by the presence of any impurity atoms that happen to have bonded to the ribbon. Again, this combination of properties is overwhelmingly likely to be unique to each device that is constructed, meaning that each device that is constructed will have a unique identifier (i.e. fingerprint) associated with it, for example as identified by or extracted from the sort of spectra already discussed above.

Figure 10:
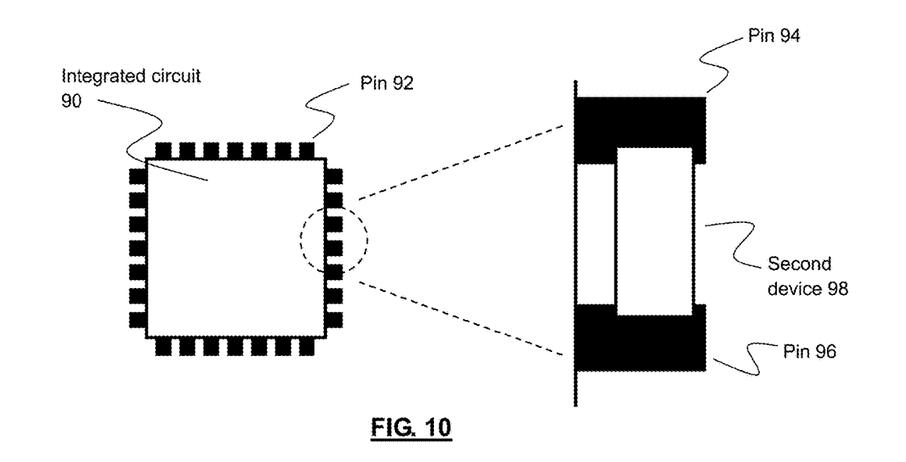
FIG. 10 schematically depicts an integrated circuit comprising a device that exhibits quantum mechanical confinement, according to another example embodiment.

FIG. 10 shows an application for the use of a unique identifier. FIG. 10 shows a first device in the form of an integrated circuit 90. Integrated circuit 90 comprises pins 92, for example for connection to other parts of a circuit. FIG. 10 also shows an expanded view of two particular pins 94, 96. Connecting those pins 94, 96 is a device 98 or structure exhibiting quantum mechanical confinement, as for example previously described. The pins 94, 96 may form a part of, or be separate to the device 98, depending on exact implementation details.

In use, the first device 90 may be used to generate a unique identifier for itself via the unique features of the device 98 that exhibits quantum mechanical confinement. Alternatively and/or additionally, the first device 90 may be provided with or store one or more identifiers, and can compare these one or more stored identifiers (that is check it) with a determined unique identifier of the device 98 that exhibits quantum mechanical confinement. In this way, the unique nature of the unique identifier of the device that exhibits quantum mechanical confinement 98 can be used in a number of ways, either providing a unique identifier to the first device 90 that comprises the second device 98, and/or to provide a cross-check, and so on. Certain functionality of the first device may be allowed or prevented depending on if the cross-check succeeds or fails.

Of course, the device shown in FIG. 10 is only one example, and simply highlights a useful application. For instance, in another example the first device and the second device may form part of other apparatus, for example a mobile phone or other device where the use of a unique identifier for security and/or cryptography is important (e.g. communications devices, storage devices, or any other suitable device). Also, FIG. 10 shows the device or structure that exhibits quantum mechanical confinement being located between, connecting or bridging pins of an integrated circuit. In another example, the device could simply be more generally described as part of another circuit that may have another function.

As described above, the quantum mechanical effect that results from quantum mechanical confinement will be 'more unique' (e.g. harder to copy, or equivalent to a higher degree of encryption) when the quantum confinement is in more that one dimension and/or when the confinement results from a more complex nano-structure, for example multiple quantum mechanical dots, or a quantum mechanical ring, versus a more simple situation of a single layer or the like. However, the uniqueness of the confinement and the resulting quantum mechanical spectra or other measurable effect may be at least partially compromised by the way in which the measurement is made and/or the way in which results are recorded. For instance, if the resolution or detail of the measurement is insufficient, this may mean that it is not possible to distinguish between two non-identical devices. That is, in terms of the 'unique' identifier (i.e. fingerprint) that is generated, this may well be the same for the different, unique devices depending on how the measurement is made/recorded. Therefore, the way in which the measurement is made and recorded may also play an important part in the generation of a unique identifier. For instance, the measurement may be encoded to a greater or lesser accuracy, depending on the level of security that is required. For instance, and in a crude example, a low level security identifier may be encoded using 8-bits or lower, whereas a much higher level of security identifier may be encoded using 128-bits or the like.

The encoding may be based on any one of a number of features, in isolation or combination, and could be based on identified certain thresholds, peaks or troughs, and also plot or peak shapes, gradients or trends.

It will be apparent that the generation (e.g. establishing) or determination (e.g. checking) of a unique identifier is important in security and cryptography and so on. It is also important that this unique identifier remains constant, so that security is maintained. However, it may be useful to change the unique identifier from time to time, for example when there is a change of security requirements. When relying on macroscopic physical effects to generate a unique identifier, it will be very difficult or even impossible to easily change the unique nature of the macroscopic physical feature. However, this is not the case when using quantum mechanical effects. For instance, simply heating (e.g. annealing) the part of the device that exhibits quantum mechanical confinement to or beyond a certain temperature may be sufficient to change the subatomic structure to an extent sufficient to change the unique confinement properties of that part of the device, and also the resulting measurable quantum mechanical effect (e.g. spectrum). For example, a temperature of approximately 400° C. might be required for GaSb, which is readily achievable when the structure is nano-scale. It is important to note, however, that the unique set of conditions that result in the unique identifier/fingerprint is non-volatile and semi-permanent—to that extent, the conditions and identifier/fingerprint are stable, but changeable.

Heating may be achieved by using a dedicated heater (e.g. a wire or tracer passing on or through the device), and/or by passing a current through the device or part thereof that exhibits quantum mechanical confinement.

In a practical example, a first device storing or provided with an identifier may cross-check this identifier with that generated or determined using a device that exhibits quantum mechanical confinement, and which is in connection (e.g. communicative and/or measurable connection) with that quantum mechanical device. The first device may function, or fully function, when this cross-check is successful. This cross-check can be deliberately made to fail by the heating of the device that exhibits quantum mechanical confinement, as previously described. This may then prevent the first device from functioning at all, or fully functioning. This may be useful, for example, when a device is compromised or stolen. A signal or similar could be sent to the first or quantum mechanical device to trigger the heating of the device/part thereof that exhibits quantum mechanical confinement, to change the unique identifier that may be generated or determined using that device. This will then prevent the first device that comprises or is in connection with the quantum mechanical device from functioning properly, or functioning at all.

The use of a measurable electrical quantum mechanical effect, or electrically measuring a unique quantum mechanical effect (which might be defined as the same functionality from different perspectives) may be advantageous over, for example, optical properties and/or measurement. The use of an electrical based approach allows for simple, quick and effective determining and/or generating of the unique identifier, for example on a chip, or within or as part of an electric circuit or device. In contrast, optical techniques might require more complex equipment, or more numerous components, which could add to cost, complexity, weight, and so on.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of generating a unique identifier for a device, the device exhibiting quantum mechanical confinement, the method comprising:
    measuring electrically a unique quantum mechanical effect of the device that results from the quantum mechanical confinement to yield a measurement, wherein the measuring is performed by another device that comprises a portion of, or is in connection with, the device that exhibits quantum mechanical confinement; and generating the unique identifier using the measurement, wherein the quantum mechanical effect is measurable by the another device in order to generate a unique identifier for the another device, using the unique identifier of the device that exhibits the quantum mechanical confinement.

2. The method of claim 1, wherein the measurement comprises a quantum mechanical spectrum of the device.

3. The method of claim 1, wherein generating the unique identifier comprises encoding and storing the measurement as the unique identifier.

4. The method of claim 1, further comprising heating the device that exhibits quantum mechanical confinement to change the unique quantum mechanical effect of the device, and thereby facilitate the provision of a new unique identifier for the device.

5. The method of claim 4, wherein the heating includes passing a current through the device.

6. The method of claim 1, wherein the another device encodes or stores the unique identifier.

7. The method of claim 6, wherein the method further comprises comparing the generated unique identifier of the device that exhibits the quantum mechanical confinement with one or more identifiers stored in the another device, adjusting a functionality of the another device in response to the generated unique identifier of the device exhibiting the quantum mechanical confinement and the stored unique identifiers are the same.

8. The method of claim 1, wherein the device that exhibits quantum mechanical confinement exhibits quantum mechanical confinement in at least two dimensions.

9. The method of claim 1, wherein the device that exhibits quantum mechanical confinement comprises at least one of:
- a tunnelling barrier;
- a resonant tunnelling diode;
- a Schottky barrier; or
- a graphene nanoribbon, wherein the quantum mechanical confinement is exhibited in one of a layer, a ring, or a dot.

10. The device of claim 1, wherein the device that exhibits quantum mechanical confinement comprises one of:
- a GaSb quantum ring in a doped GaAs structure; or
- a GaSb quantum ring, with AlGaAs tunnelling barriers, in a doped GaAs structure.

11. A method for identifying a device, the method comprising:

causing the device to exhibit quantum mechanical confinement;

measuring electrically a unique quantum mechanical effect of the device that results from the quantum mechanical confinement to yield a measurement, wherein the measuring is performed by another device that comprises a portion of, or is in connection with, the device that exhibits quantum mechanical confinement; and generating a unique identifier derived from a measurable electrical unique quantum mechanical effect of the device that results from the quantum mechanical confinement, wherein the quantum mechanical effect is measurable by the another device in order to generate a unique identifier for the another device, using the unique identifier of the device that exhibits the quantum mechanical confinement.

12. An apparatus, comprising:

a first device exhibiting a measurable quantum mechanical confinement;

a second device connected to, or comprising a portion of, the first device, wherein the second device exhibits quantum mechanical confinement, and wherein the second device has a measurable electrical unique quantum mechanical effect that results from the quantum mechanical confinement; wherein the electrical unique quantum mechanical effect is measurable by the first device to generate a unique identifier for the second device and the first device.

13. The apparatus of claim 12, wherein the first device includes an integrated circuit;

the second device forms a part of the integrated circuit; and the second device connects one pin of the integrated circuit to another pin of the integrated circuit.

* * * * *